United States Patent
Diop et al.

(10) Patent No.: US 12,341,326 B2
(45) Date of Patent: Jun. 24, 2025

(54) MID-SPAN TAP CONNECTOR

(71) Applicant: Hubbell Incorporated, Shelton, CT (US)

(72) Inventors: Seydou Diop, Birmingham, AL (US); Adrian Beau Candelaria, Alabaster, AL (US)

(73) Assignee: Hubbell Incorporated, Shelton, CT (US)

( * ) Notice: Subject to any disclaimer, the term of this patent is extended or adjusted under 35 U.S.C. 154(b) by 267 days.

(21) Appl. No.: 17/923,857

(22) PCT Filed: May 7, 2021

(86) PCT No.: PCT/US2021/031293
§ 371 (c)(1),
(2) Date: Nov. 7, 2022

(87) PCT Pub. No.: WO2021/226456
PCT Pub. Date: Nov. 11, 2021

(65) Prior Publication Data
US 2023/0178974 A1    Jun. 8, 2023

Related U.S. Application Data

(60) Provisional application No. 63/021,812, filed on May 8, 2020.

(51) Int. Cl.
*H02G 15/08* (2006.01)
*H02G 1/02* (2006.01)
*H02G 7/05* (2006.01)

(52) U.S. Cl.
CPC ............. *H02G 15/08* (2013.01); *H02G 7/053* (2013.01)

(58) Field of Classification Search
CPC ........... H02G 1/02; H02G 15/08; H02G 7/053
See application file for complete search history.

(56) References Cited

U.S. PATENT DOCUMENTS

| | | | |
|---|---|---|---|
| 2,164,022 A * | 6/1939 | Rowe | H01R 4/46 403/390 |
| 2,979,555 A | 4/1961 | Bridges | |
| 3,848,956 A | 11/1974 | Kraft | |
| 4,892,275 A | 1/1990 | Szegda | |
| 6,045,414 A | 4/2000 | DeFrance | |
| 2015/0162670 A1 | 6/2015 | Galla et al. | |

OTHER PUBLICATIONS

International Search Report and Written Opinion mailed in Application No. PCT/US2021/031293, dated Aug. 4, 2021.

* cited by examiner

*Primary Examiner* — Hoa C Nguyen
*Assistant Examiner* — Amol H Patel
(74) *Attorney, Agent, or Firm* — Robinson + Cole LLP

(57) ABSTRACT

A mid-span tap connector for a utility line includes a base bracket having a base upper groove configured to receive a tap line and a base lower groove configured to receive a primary line. A cap bracket is configured to be connected to the base bracket. The cap bracket has a cap groove configured to receive the primary line. A tap bracket is configured to be connected to the base bracket. The tap bracket has a tap main body with a tap groove configured to receive the tap line. The main body and tap groove extend non-parallel to the primary line in an assembled state.

20 Claims, 6 Drawing Sheets

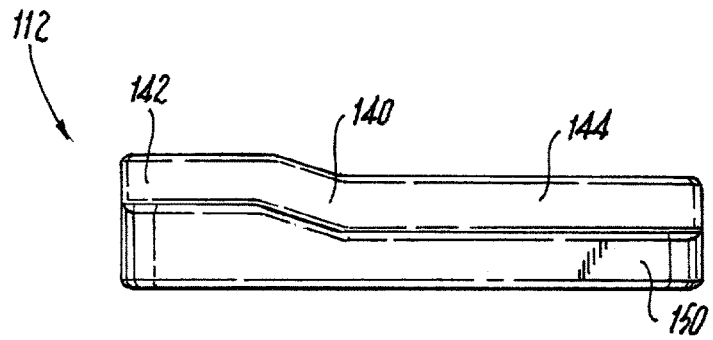
Fig. 10
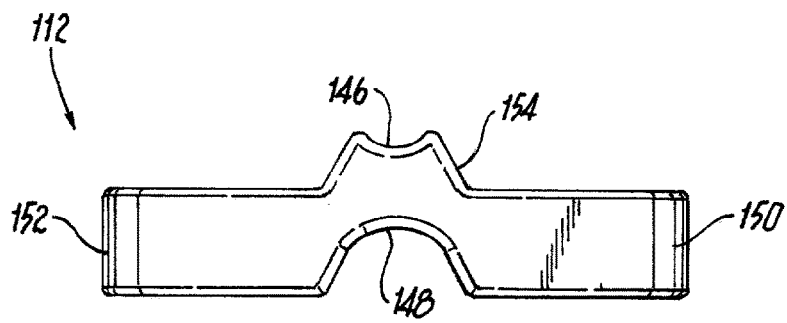
Fig. 11
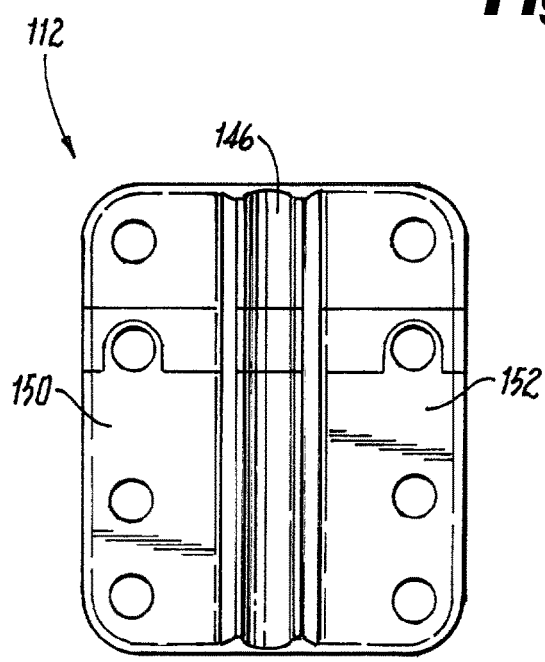 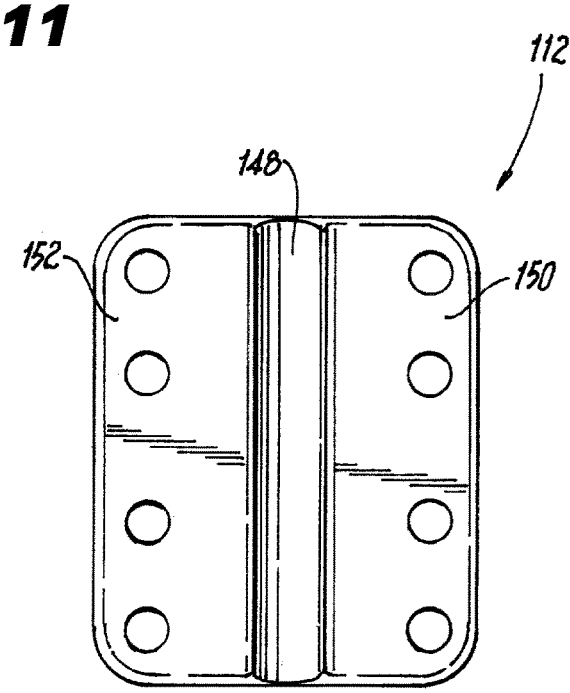
Fig. 12  Fig. 13

MID-SPAN TAP CONNECTOR

FIELD

Various exemplary embodiments relate to utility line connectors.

BACKGROUND

Utility transmission lines are used to route utility connections over large distances. For example, overhead power lines utilize conductors strung along towers and poles to provide power from a power plant over long distances to residential locations. Other utilities, such as data/communication lines can be routed in similar fashion.

Utility lines often follow many branching paths, with different connections made at support structures such as at a cross arm mounted to a pole. These poles are often spaced at large distances, for example 100 ft or more in urban locations and 300 ft or more in rural areas. Sometimes connections may need to be made at a location that is between two poles.

SUMMARY

According to various embodiments, a mid-span tap connector for a utility line includes a base bracket having a base upper groove configured to receive a tap line and a base lower groove configured to receive a primary line. A cap bracket is configured to be connected to the base bracket. The cap bracket has a cap groove configured to receive the primary line. A tap bracket is configured to be connected to the base bracket. The tap bracket has a tap main body with a tap groove configured to receive the tap line. The main body and tap groove extend non-parallel to the primary line in an assembled state.

According to various embodiments, a mid-span tap connector for a utility line includes a base bracket having a first side and a second side. The first side includes a base upper groove configured to receive a tap line. The second side has a base lower groove configured to receive a primary line. A cap bracket is configured to be connected to the base bracket facing the second side. The cap bracket has a cap groove configured to receive the primary line. A tap bracket is configured to be connected to the base bracket facing the first side. The tap bracket has a tap groove configured to receive the tap line. In an assembled state, the primary line is clamped between the base bracket and the cap bracket and the tap line is clamped between the base bracket and the tap bracket.

Certain embodiments include a method of connecting a tap line to a primary line in a utility transmission system. A cap bracket and a base bracket are positioned near a utility primary line. The cap bracket and the base bracket are connected to clamp the primary line therebetween. A tap line and a tap bracket are positioned adjacent the base bracket. The tap line is clamped between the tap bracket and the base bracket.

BRIEF DESCRIPTION OF THE DRAWINGS

The aspects and features of various exemplary embodiments will be more apparent from the description of those exemplary embodiments taken with reference to the accompanying drawings, in which:

FIG. 10 is a side view of the base bracket of FIG. 3.

FIG. 11 is a front view of the base bracket.

FIG. 12 is a top view of the base bracket.

FIG. 13 is a bottom view of the base bracket.

DETAILED DESCRIPTION OF EXEMPLARY EMBODIMENTS

Figure 1:
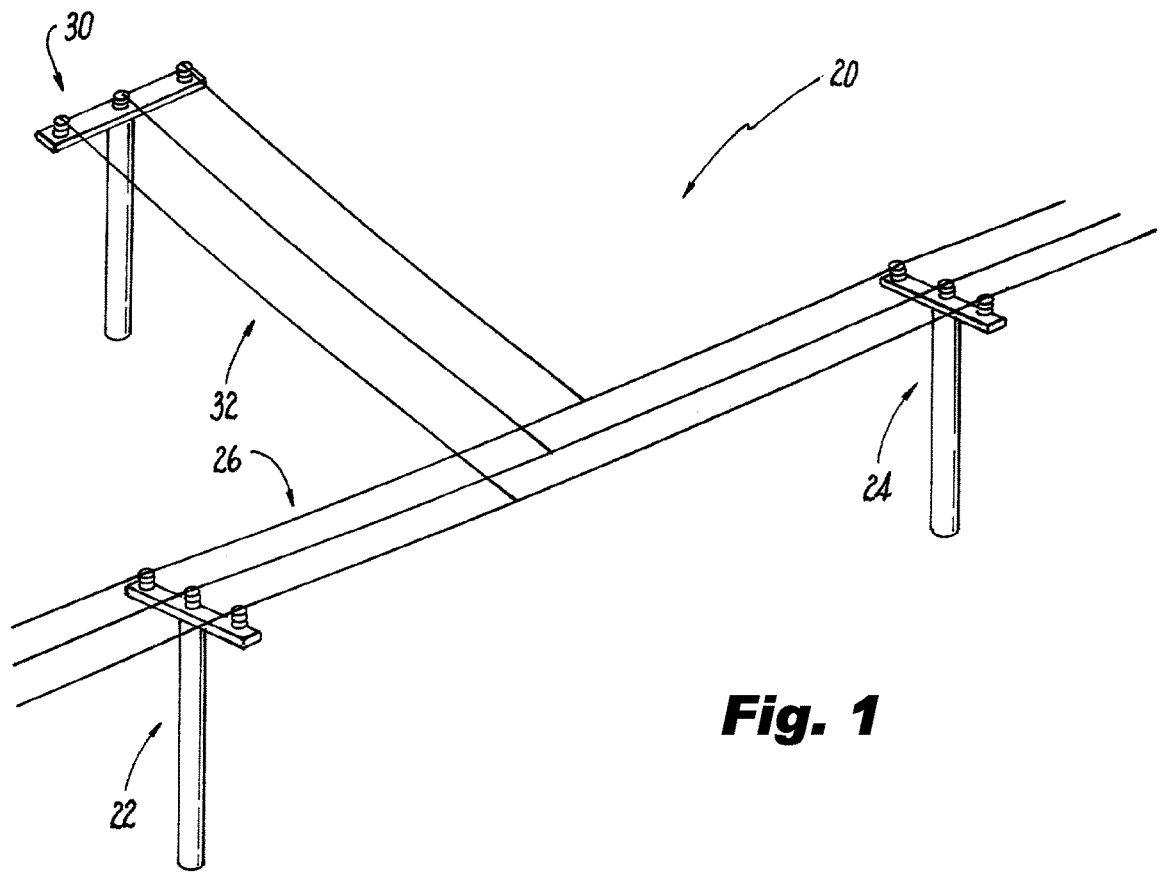
FIG. 1 is a schematic view of a utility line.

FIG. 1 shows a schematic illustration of a utility line system 20 that includes a first pole 22, a second pole 24, and a first set of conductors (primary line) 26 extending between the first and second poles 22, 24. The first and second poles 22, 24 are spaced a certain distance apart, for example about 100 ft. It can be desired to route power in a direction different than the longitudinal axis of the first set of conductors 26. For example a third pole 30 is positioned at a distance between the first and second poles 22, 24 and a second set of conductors (tap line) 32 extend between the third pole 30 and the first set of conductors 26. Typically a pole would need to be positioned between the first and second poles 22, 24 that is aligned with the third pole 30 so that a connection to the first set of conductors 26 can be made.

Figure 2:
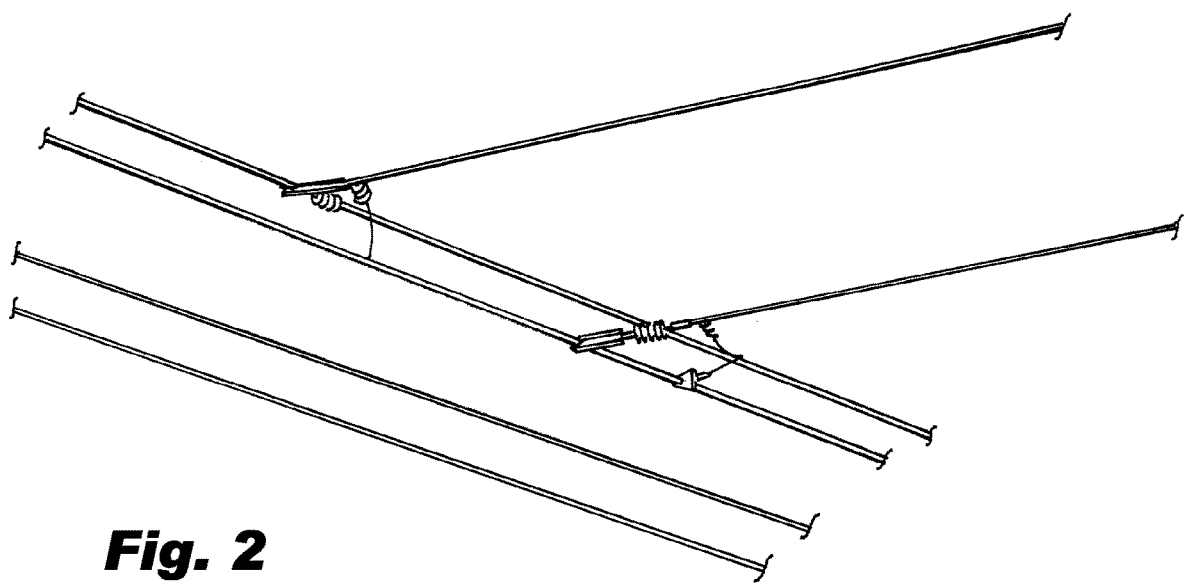
FIG. 2 is a perspective view of a utility line connection assembly.
Figure 3:
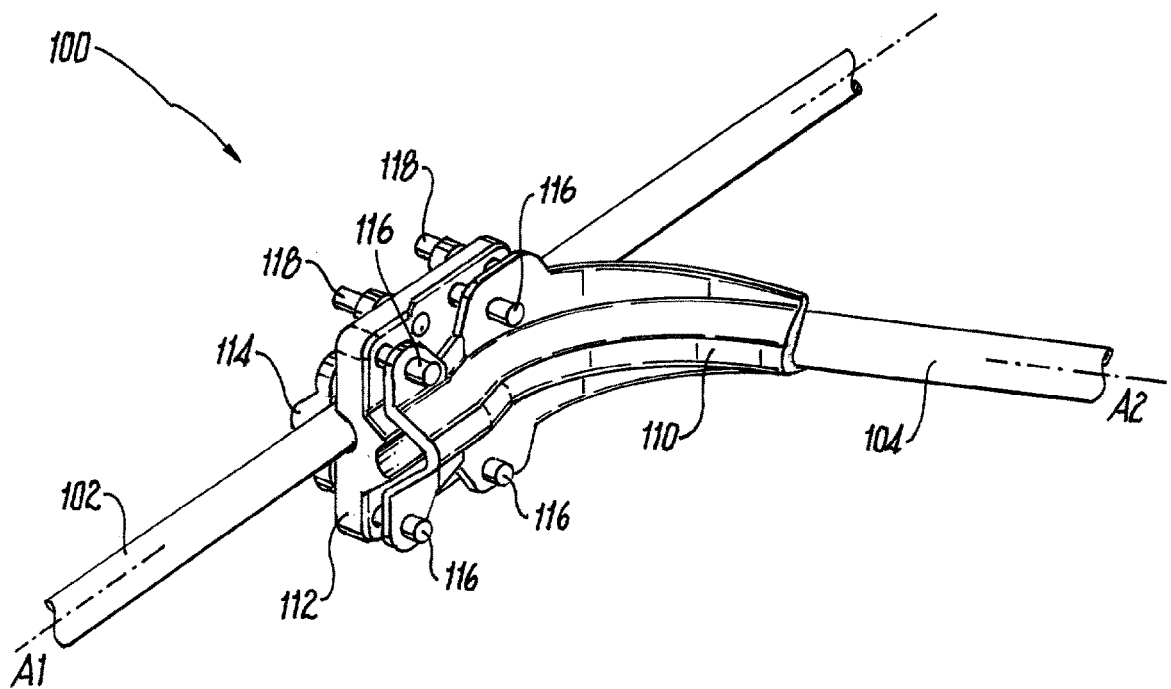
FIG. 3 is a perspective view of an exemplary mid-span connector connected to a primary line and a tap line.
Figure 4:
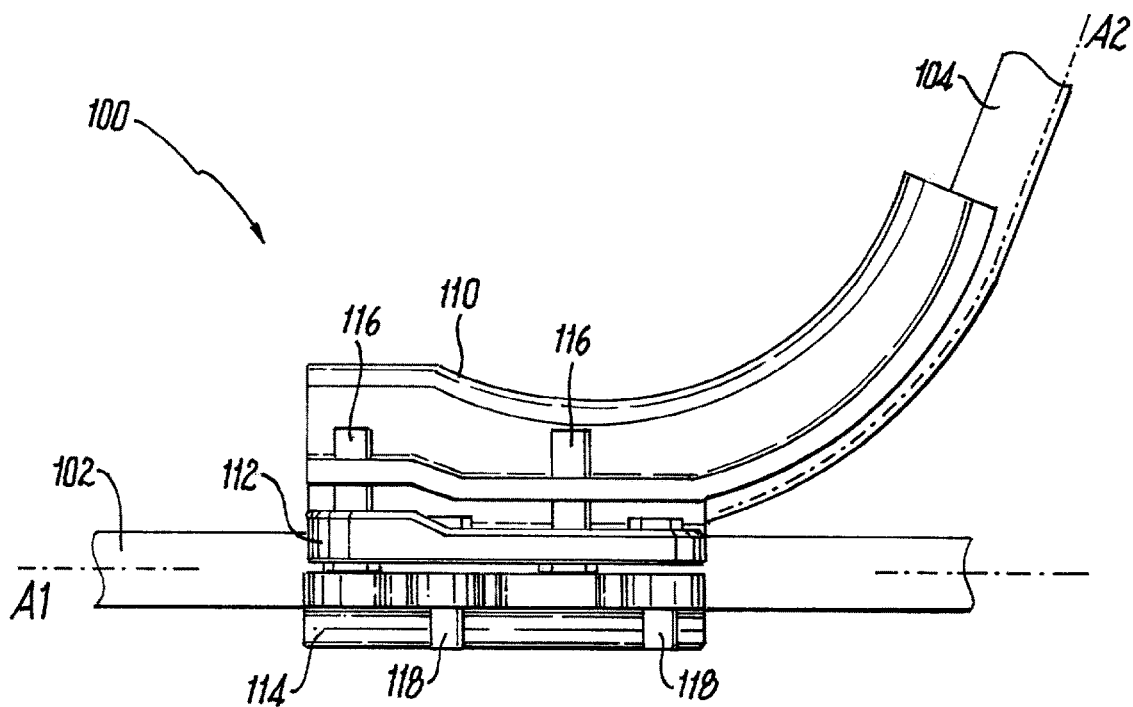
FIG. 4 is a side view of FIG. 3.
Figure 5:
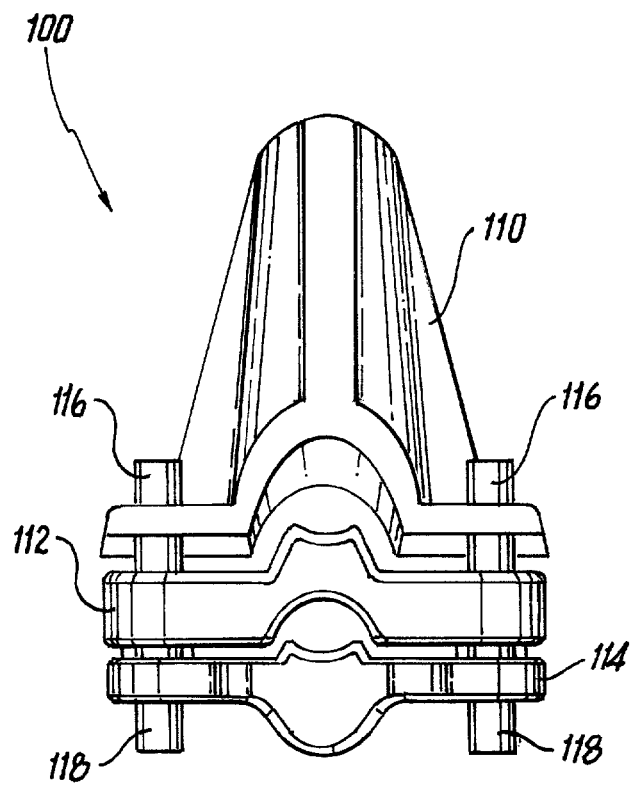
FIG. 5 is a front view of the mid-span connector of FIG. 3.
Figure 6:
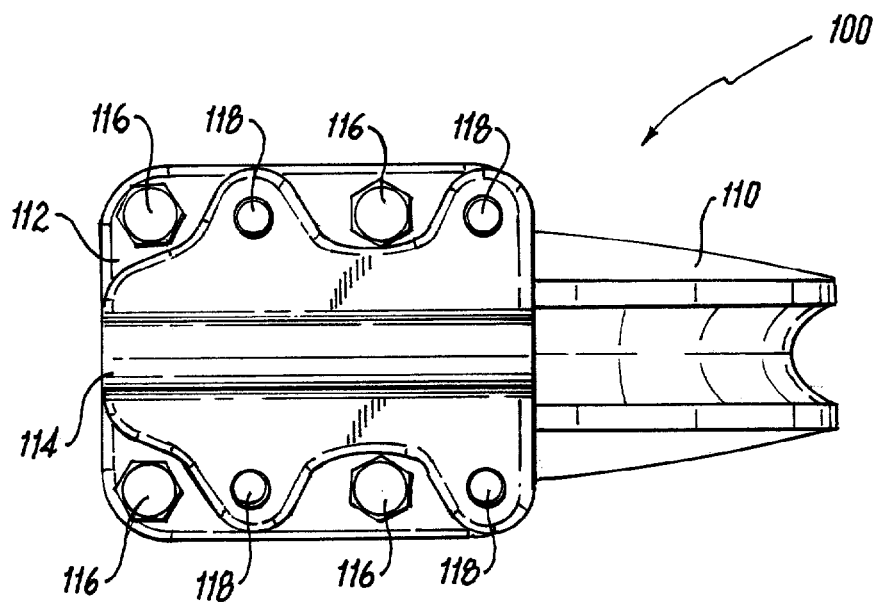
FIG. 6 is a bottom view of the mid-span connector of FIG. 3.

In some instances, it is not practical to place another pole to make a connection. In such cases, the first set of conductors 26 and the second set of conductors 32 need to be electrically and mechanically connected using a mid-span tap or flying tap assembly. Such assemblies typically include multiple different connectors to create sufficient mechanical and electrical connections between the main lines and tap lines. FIG. 2 shows one example of such an assembly, which requires multiple connectors.

FIGS. 3-6 show an exemplary mid-span connector 100 that includes multiple brackets used to mechanically and electrically connect a primary line 102 and a tap line 104. The primary line 102 extends along a first direction A1 and the mid-span connector 100 is configured to attach to the primary line 102 and connect a secondary line 104 so that it can extend along a second direction A2 that is different from the first direction A1. In some configurations, the tap line 104 extends non-parallel to the primary line 102. In some configurations, the tap line 104 can extend substantially orthogonal to the primary line 102. In some configurations the tap line 104 will extend between approximately 60 and 90 degrees relative to the primary line 102. In certain configurations, the tap line 104 will have a first section that extends substantially parallel to the primary line 102 and a second section that extends non-parallel to the primary line 102.

The mid-span connector can include a tap bracket 110, a base bracket 112, and a cap bracket 114. The tap bracket 110 and cap bracket 114 can be directly connected to the base bracket 112, and indirectly connected to each other through the base bracket 112. For example, a first set of fasteners 116 engages the tap bracket 110 and the base bracket 112 and a second set of fasteners 118 engages the cap bracket 114 and the base bracket 112.

Figure 7:
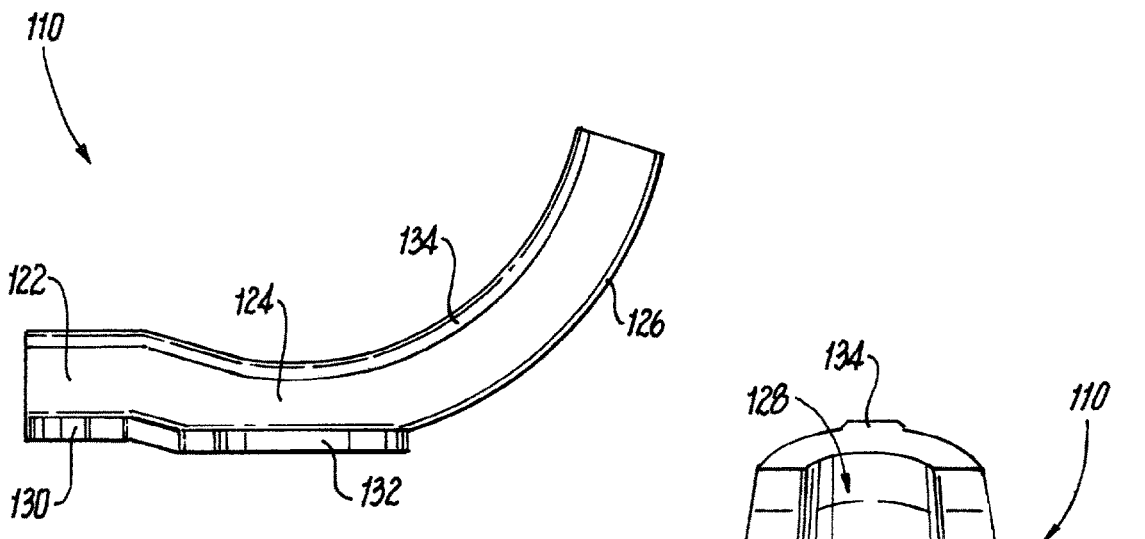
FIG. 7 is a side view of the tap bracket of FIG. 3.
Figure 8:
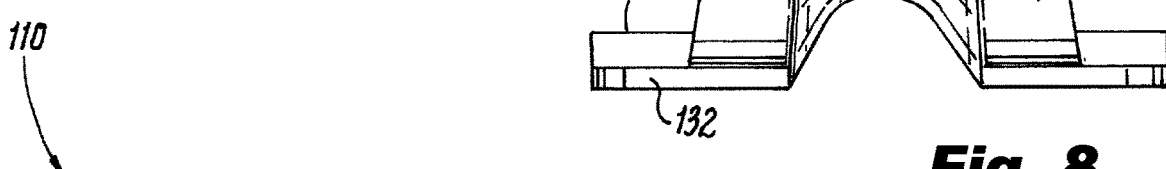
FIG. 8 is a rear view of the tap bracket.
Figure 9:
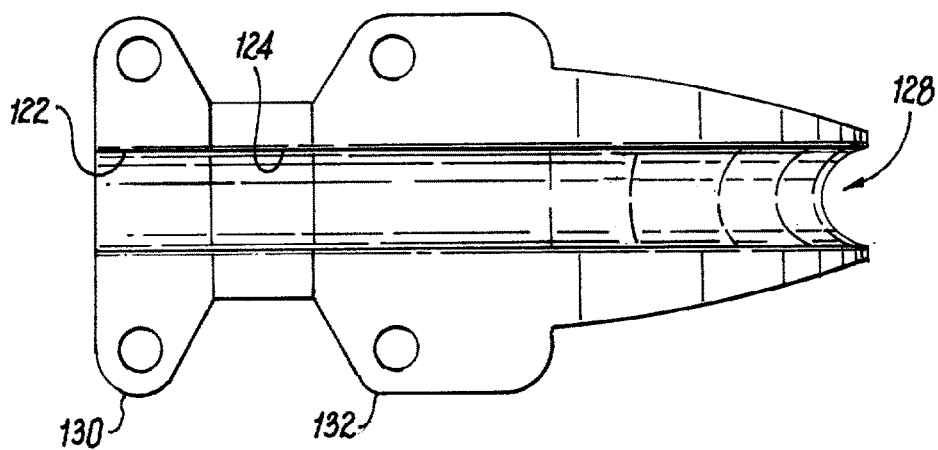
FIG. 9 is a bottom view of the tap bracket.

FIGS. 7-9 show an example of the tap bracket 110. The tap bracket includes a main body 120 having a front section 122, a central region 124, and a rear portion 126. The main body 120 includes a tap groove 128 that extends along the length of the main body 120. The tap groove 128 is configured to receive a tap line 104, for example an electrical tap conductor. The size, shape, and configuration of the tap groove 128 can therefore be adjusted based on the tap line to ensure a secure connection.

The front section 122 includes at least a portion that extends above the central region 124. As best shown in FIG. 7, the front section 122 has an angled stepped configuration that extends above the central region 124. Other configurations, for example a curved section, can also be used.

The rear portion 126 of the tap bracket 110 extends above the front section 122 and the central region 124. For example, the rear portion 126 curves to extend above the front section 122 and the central region 124. The curve changes the direction of the tap line 104 so that it can extend in a different direction than the primary line 102. The curved section can have one or more radius of curvature. In some aspects, the rear portion 126 can be angled or stepped to change the direction of the tap line.

The tap bracket 110 also includes a set of first flanges 130 and a set of second flanges 132 that extend from the side of the main body 120. The first flanges 130 can extend from the side of the front section 122 and the second flanges 132 can extend from the sides of the central region 124, although other configurations can be used. Each of the flanges 130, 132 includes an opening to receive one of the first set of fasteners 116. The main body 120 can be curved so that it arcs above the first and second flanges 130, 132. The main body 120 can also include a curved projection 134 that extends along the middle of the main body 120.

FIGS. 10-13 show an example of the base bracket 112. The base bracket 112 includes a main body 140 having a front section 142 and a rear section 144. The main body 140 includes an upper groove 146 and a lower groove 148 that both extend along the length of the main body 140. The upper groove 146 is configured to receive the tap line 104 and the lower groove 148 is configured to receive the primary line 102. The size, shape, and configuration of the upper groove 146 and lower groove 148 can therefore be adjusted based on the primary line 102 and the tap line 104 to ensure a secure connection.

The front section 142 includes at least a portion that extends above the rear section 144. As best shown in FIG. 10, the front section 142 has an angled stepped configuration that extends above the rear section 144. Other configurations, for example a curved section, can also be used.

The base bracket 112 also includes a first flange 150 and a second flange 152 extending from the main body. Each flange 150, 152 includes a first set of openings and a second set of openings. The first set of openings receive the first fasteners 116 and the second set of openings receive the second fasteners 118. The main body 140 can extend above the first and second flanges 150, 152. The illustrated example shows angled side walls 154 that extend above the flanges, however other configurations can be used.

Figure 14:
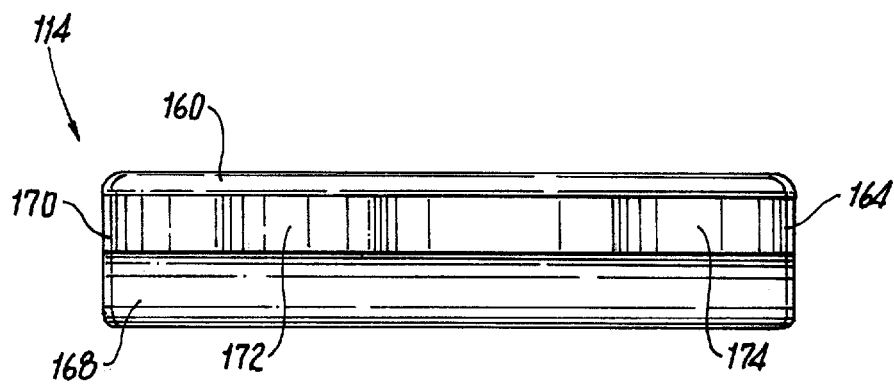
FIG. 14 is a side view of the cap bracket of FIG. 3.
Figure 15:
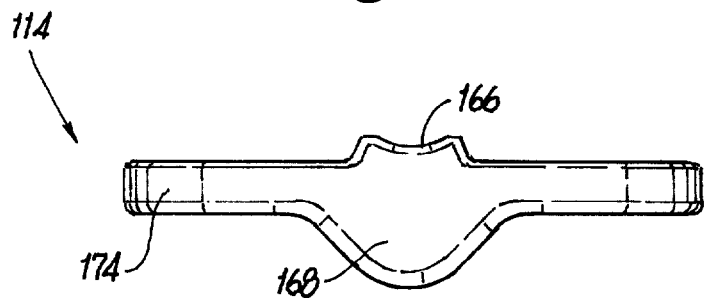
FIG. 15 is a rear view of the cap bracket.
Figure 16:
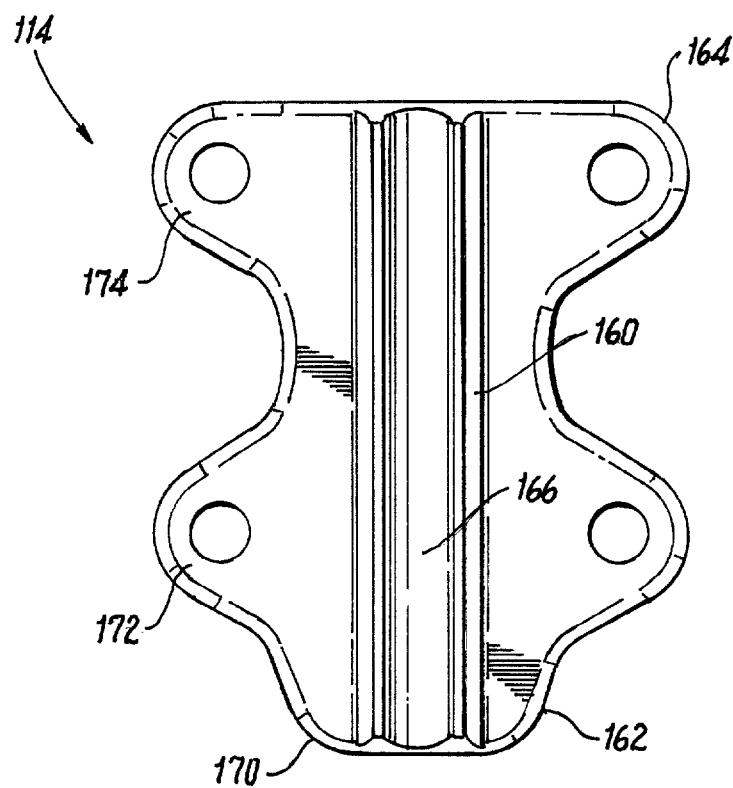
FIG. 16 is a top view of the cap bracket.

FIGS. 14-16 show an example of the cap bracket 114. The cap bracket 114 includes a main body 160 having a front section 162 and a rear section 164. The main body 160 includes an upper groove 166 and a lower projection 168 that both extend along the length of the main body 160. The upper groove 166 is configured to receive the primary line 102. The size, shape, and configuration of the upper groove 166 can therefore be adjusted based on the primary line 102 to ensure a secure connection. The lower projection 168 includes a rounded surface to help reduce corona discharge. The front section can also include a rounded nose 170 to help reduce corona discharge.

The cap bracket 114 also includes a set of first flanges 172 and a set of second flanges 174 that extend from the side of the main body 160. The first flanges 172 can extend from the side of the front section 162 and the second flanges 174 can extend from the sides of the rear section 164, although other configurations can be used. Each of the flanges 172, 174 includes an opening to receive one of the second set of fasteners 118.

During installation, a technician can position the cap bracket 114 and the base bracket 112 near a primary utility line 102, for example a power line. The cap bracket 114 is positioned to receive the primary line 102 in the cap bracket upper groove 166 and the base bracket 112 is positioned to receive the primary line 102 in the base bracket lower groove 148. The cap bracket 114 can then be secured to the base bracket 112, for example using fasteners 118. A tap line 104 can then be placed in the base bracket upper groove 146 and the tap bracket 110 can be positioned to receive the tap line 104 in the tap bracket groove 128. The tap bracket 110 can then be secured to base bracket 112, for example using fasteners 116. These operations can be performed in various orders as would be understood by one of ordinary skill.

Although electrical conductors are shown and described above, the mid-span connector can also be used with other utility lines, such as phone lines and fiber optic lines.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A mid-span tap connector for a utility line comprising:
a base bracket having a base upper groove configured to receive a tap line and a base lower groove configured to receive a primary line;
a cap bracket configured to be connected to the base bracket, the cap bracket having a cap groove configured to receive the primary line; and
a tap bracket configured to be connected to the base bracket, the tap bracket having a tap main body with a tap groove configured to receive the tap line, wherein the main body and tap groove extend non-parallel to the primary line in an assembled state;
wherein the cap bracket includes a curved projection extending opposite the cap groove.

2. The mid-span tap connector of claim 1, wherein the tap main body extends substantially perpendicular to the primary line in the assembled state.

3. The mid-span tap connector of claim 1, wherein the tap main body curves away from the primary line in the assembled state.

4. The mid-span tap connector of claim 1, wherein a first set of fasteners connects the tap bracket to the base bracket and wherein a second set of fasteners connect the cap bracket to the base bracket.

5. The mid-span tap connector of claim 1, wherein the tap bracket includes a front section, a central region, and a rear portion, and wherein the front section extends above the central region and the rear portion extends above the central region and front section.

6. The mid-span tap connector of claim 1, wherein the base bracket includes a front section that extends above a rear section.

7. The mid-span tap connector of claim 6, wherein the base bracket includes a first flange and a second flange extending from a body.

8. The mid-span tap connector of claim 1, wherein the cap bracket includes a set of first flanges and a set of second flanges that extend from the sides of a body.

9. The mid-span tap connector of claim 1, wherein the cap bracket includes a front section having a rounded nose.

10. The mid-span tap connector of claim 1, wherein the tap line extends at an angle between approximately 60-90 degrees from the primary line in the assembled state.

11. The mid-span tap connector of claim 1, wherein the tap main body has a front section with a stepped configuration.

12. A mid-span tap connector for a utility line comprising:
a base bracket having a base upper groove configured to receive a tap line and a base lower groove configured to receive a primary line;
a cap bracket configured to be connected to the base bracket, the cap bracket having a cap groove configured to receive the primary line; and
a tap bracket configured to be connected to the base bracket, the tap bracket having a tap main body with a tap groove configured to receive the tap line, wherein the main body and tap groove extend non-parallel to the primary line in an assembled state;
wherein the cap bracket includes a set of first flanges and a set of second flanges that extend from the sides of a body.

13. The mid-span tap connector of claim 12, wherein the tap main body extends substantially perpendicular to the primary line in the assembled state.

14. The mid-span tap connector of claim 12, wherein the tap main body curves away from the primary line in the assembled state.

15. The mid-span tap connector of claim 12, wherein the cap bracket includes a front section having a rounded nose.

16. The mid-span tap connector of claim 12, wherein the tap line extends at an angle between approximately 60-90 degrees from the primary line in the assembled state.

17. A mid-span tap connector for a utility line comprising:
a base bracket having a base upper groove configured to receive a tap line and a base lower groove configured to receive a primary line;
a cap bracket configured to be connected to the base bracket, the cap bracket having a cap groove configured to receive the primary line; and
a tap bracket configured to be connected to the base bracket, the tap bracket having a tap main body with a tap groove configured to receive the tap line, wherein the main body and tap groove extend non-parallel to the primary line in an assembled state;
wherein the cap bracket includes a front section having a rounded nose.

18. The mid-span tap connector of claim 17, wherein the tap main body extends substantially perpendicular to the primary line in the assembled state.

19. The mid-span tap connector of claim 17, wherein the tap main body curves away from the primary line in the assembled state.

20. The mid-span tap connector of claim 17, wherein the cap bracket includes a curved projection extending opposite the cap groove.

* * * * *